(12) United States Patent
Wenckel et al.

(10) Patent No.: US 8,127,455 B2
(45) Date of Patent: Mar. 6, 2012

(54) PORTABLE IMPLEMENT

(75) Inventors: Matthias Wenckel, Hannover (DE); Carsten Ziegs, Hamburg (DE)

(73) Assignee: DOLMAR GmbH (DE)

( * ) Notice: Subject to any disclaimer, the term of this patent is extended or adjusted under 35 U.S.C. 154(b) by 292 days.

(21) Appl. No.: 12/437,307

(22) Filed: May 7, 2009

(65) Prior Publication Data

US 2009/0277021 A1    Nov. 12, 2009

(30) Foreign Application Priority Data

May 9, 2008    (DE) .................. 20 2008 006 396

(51) Int. Cl.
*A01D 34/84*    (2006.01)
*A01D 34/90*    (2006.01)

(52) U.S. Cl. ........................................ 30/276; 30/296.1
(58) Field of Classification Search ............ 30/276, 30/296.1, 298; 172/14, 41; 56/12.7
See application file for complete search history.

(56) References Cited

U.S. PATENT DOCUMENTS

| 2,536,607 | A | * | 1/1951 | Jenkins ............... 56/400.17 |
| 3,453,732 | A | * | 7/1969 | Wilkin ................ 30/296.1 |
| 4,179,805 | A | * | 12/1979 | Yamada ................ 30/122 |
| 4,188,719 | A |   | 2/1980 | Hoff |
| 4,282,652 | A | * | 8/1981 | Ballas, Sr. ............ 30/276 |
| 4,288,171 | A | * | 9/1981 | Kottke ................ 403/218 |
| 4,364,435 | A | * | 12/1982 | Tuggle et al. ........... 172/15 |
| 5,669,101 | A | * | 9/1997 | Aiyama et al. ........... 16/436 |
| 6,056,668 | A | * | 5/2000 | Nagashima ............ 477/207 |
| 6,701,623 | B2 | * | 3/2004 | Sanders ................ 30/276 |
| 6,745,475 | B1 |   | 6/2004 | Trumpf |
| 6,880,251 | B2 | * | 4/2005 | Gambert ............... 30/296.1 |
| 6,942,416 | B2 | * | 9/2005 | Karlsson ............... 403/84 |
| 7,739,800 | B2 | * | 6/2010 | Hurley et al. ........... 30/276 |
| 7,891,099 | B2 | * | 2/2011 | Wenckel ............... 30/276 |
| 7,917,997 | B2 | * | 4/2011 | Jonsson ................ 16/426 |

FOREIGN PATENT DOCUMENTS

| AT | 30433 | 10/1907 |
| DE | 19956332 A1 | 5/2001 |
| DE | 10132951 A1 | 1/2002 |
| EP | 0284659 A2 | 10/1988 |
| EP | 0753245 A1 | 1/1997 |
| JP | 10108520 | 4/1998 |

OTHER PUBLICATIONS

German Patent Office, German Search Report issued in connection with DE 20 2008 006 396.5, Nov. 19, 2009, Munich, Germany.

* cited by examiner

*Primary Examiner* — Hwei C Payer
(74) *Attorney, Agent, or Firm* — Kelly & Kelley, LLP (57) ABSTRACT

A portable implement is provided that includes a guide rod having a tool element arranged on one end and a motor for driving the tool element arranged on the other end. A holding element for holding the portable implement is arranged between the tool element and the motor. A connecting element is arranged on the guide rod or on the holding element, for connecting the holding element with the guide rod. The connecting element, in a first position of an operating element, is connected with the guide rod displaceably in a longitudinal direction on the guide rod. The connecting element, in a second position of the operating element, is releasably fixed on the guide rod.

12 Claims, 10 Drawing Sheets

PORTABLE IMPLEMENT

TECHNICAL FIELD

The present invention concerns a portable, in particular a hand-operated, implement having at least one tool element, arranged on one end of a guide rod, for sawing, cutting and/or scything, at least one motor, arranged at the other end of the guide rod, for driving the tool element, at least one holding element, arranged between the tool element and the motor, and at least one connecting element, arranged on the guide rod and/or on the holding element, connecting the holding element to the guide rod.

PRIOR ART

A portable or hand-operated implement of the type mentioned in the introduction is known for example from the publication DE 199 56 332 A1 or from the publication DE 38 39 548 C2. Furthermore, a trimmer with the features of the introductory clause of Claim 1 is known from the manufacturer Husqvarna. This is the model 250 R, in which the holding element or grip element is connected indirectly with the motor by means of a connecting element.

In the known scythes and trimmers, the holding element is connected with the guide rod at a fixed distance from the motor. This fixed connection between holding element and guide rod can take place both directly and also indirectly. An adaptation to the body size of the user is not provided in these known portable implements, or is very complicated, because a renewed bracing of the damping system would be necessary.

To adjust the operating position of the portable implement, according to the prior art a sling strap, formed for slinging the implement around the user, is fitted into different recesses of a perforated strip which is fixedly arranged on the connecting element and/or on the guide rod. In so doing, the implement is balanced such that the tool element runs parallel to the ground. A setting of the individual body size can not be achieved hereby.

PRESENTATION OF THE INVENTION: OBJECT, SOLUTION, ADVANTAGES

Proceeding from the disadvantages and shortcomings set forth above, and taking into account the outlined prior art, the present invention is based on the problem of further developing a portable implement of the type initially mentioned, such that the operating position of the portable implement can be adjusted individually, in particular that the operating position of the portable implement is adjustable to the individual body size of the user and/or to the respective tool application, for example to different tool elements, such as for instance the thread head or metal tool.

This problem is solved by a portable implement with the features indicated. Advantageous developments and expedient further developments of the present invention are characterized in the respective sub-claims.

Proceeding from the problem of making possible as flexible an adaptation of the implement as possible, in particular as ergonomic an adaption of the implement as possible to the operator and/or to the tool element of the implement, the present invention is based on providing a portable implement in which a holding element, for example constructed as a handlebar and/or provided with at least one hand grip and/or gas grip, is able to be fastened or fixed in different positions of the guide rod.

For this, the holding element is connected with the guide rod by means of a connecting element which is displaceable, in particular continuously, in longitudinal direction to the guide rod. The displaceability of the holding element substantially improves the flexibility, in particular the ergonomics of the portable implement, because there is a better adjustability to the size of the operator. The displacement takes place for example in that a front position, facing the motor, is selected by tall people and a rear position, facing the tool element, is selected by short people.

For this purpose, the connecting element advantageously has at least one force-fitting and/or form-fitting element, constructed for the production of a force-fitting and/or form-fitting connection, for example at least one clamping block. This force-fitting and/or form-fitting element cooperates with the operating element such that the force-fitting and/or form-fitting element
  in the first position of the operating element is guided in a longitudinal groove of the guide rod and
  in the second position of the operating element is connected in a force-fitting and/or form-fitting manner with the guide rod, in particular is clamped securely on the guide rod, for example on the longitudinal groove.

The operating element can be mounted here rotatably and/or swivellably on the connecting element, in particular can be constructed as at least one lever system.

Alternatively or additionally to a clamping connection, the connecting element in the second position of the operating element could also be connected with the guide rod by means of a snap connection.

As a technical innovation, it is therefore proposed that the connecting element is displaceable in longitudinal direction to the implement for adjusting the desired operating position of the portable implement. This can be realized for example in that the connecting element is constructed as a bridge crosspiece which is displaceable in longitudinal direction to the guide rod. As the connecting element which is connected with the holding element constitutes a displaceable mass, the overall position of the centre of gravity of the portable implement is altered by a longitudinal displacement of the holding element.

Expediently, when it is being used, the portable implement is carried by the user by means of at least one sling element, in particular by means of at least one sling strap. Here, to adapt the portable implement to the body, in particular to the body height and/or the body build of the user and/or to the respective tool element, the sling element can be arranged, in particular fitted onto or into respective openings arranged staggered with respect to each other in longitudinal direction to the guide rod. The sling element or the carrying strap can engage for example for instance in the centre of gravity of the trimmer apparatus.

From the combination of the displaceability of the holding element, arranged on the connecting element, in longitudinal direction to the guide rod with the possibility of arranging the sling element on the different openings or recesses, for example with the combination of different fitting points for the sling strap, a vertical adjustment of the tool element is produced for the fastening- or fitting point of the strap. This makes possible a particularly flexible adaptation of the implement to the user and/or to the surface which is to be worked on and/or to the respective tool element.

To fix the desired operating position, the holding element advantageously has at least one arresting- and/or detent element cooperating with the operating element, wherein the operating element in its second position is locked and/or engaged with the arresting- and/or detent element, and in its first position is released therefrom.

The holding element can be connected with the connecting element for example by means of a releasable clamping connection, for instance in the manner of a clamping block and/or a clamping collar. This can take place in a conventional manner. Thus, for example, in an embodiment of the present invention, a conventional clamping block for securely clamping the holding element of a portable implement is displaceable in longitudinal direction to the guide rod by means of the holding element, which can be constructed for example as a bridge cross-piece. In contrast to this, in conventional trimmers or scythes, the clamping block is mounted securely or immovably on the guide rod.

The present invention further relates to a principle for the adjustment of the operating position of a portable implement, in particular of a trimmer or of a brushcutter, in particular for the adjustment at least of a tool element, constructed for sawing and/or cutting and/or scything for example of undergrowth and/or grass, of the portable implement into its desired operating position, for example parallel to the surface which is to be worked on. Here, the tool element is arranged on one end of a guide rod and on the other end of the guide rod in particular as a balancing weight at least one motor, in particular a combustion motor, is arranged which is constructed for driving the tool element. In addition, between the tool element and the motor at least one holding element is arranged, constructed for holding, in particular for carrying and/or for guiding and/or for steering and/or for operating the portable implement, wherein the holding element is connected to the guide rod by means at least of one connecting element arranged on the guide rod and/or on the holding element. To adjust the operating position of the portable implement, the connecting element is displaced in longitudinal direction to the guide rod, and for fixing the desired adjustment of the portable implement, the connecting element is fixed releasably on the guide rod, in particular is connected with the guide rod in a force-fitting and/or form-fitting manner.

To adjust the holding element, in particular to adapt the holding element to the body of the user and/or for the space-saving arrangement of the portable implement, the holding element, which is connected with the connecting element, can be advantageously rotated about its axis which is arranged substantially at right-angles to the longitudinal extent of the guide rod. In addition, for fixing the desired adjustment of the holding element, the holding element can be expediently connected immovably with the connecting element.

The present invention, finally, relates to the use of at least one portable implement according to the type set forth above and/or of the principle according to the type set forth above for the ergonomic sawing and/or cutting and/or scything for example of undergrowth and/or of grass.

BRIEF DESCRIPTION OF THE DRAWINGS

As already discussed above, there are various possibilities for forming and further developing the teaching of the present invention in an advantageous manner. Further, developments, features and advantages of the present invention are described in further detail below with the aid of the illustrated example embodiment, showing in perspective illustration.

BEST WAY TO CARRY OUT THE INVENTION

Figure 1A:
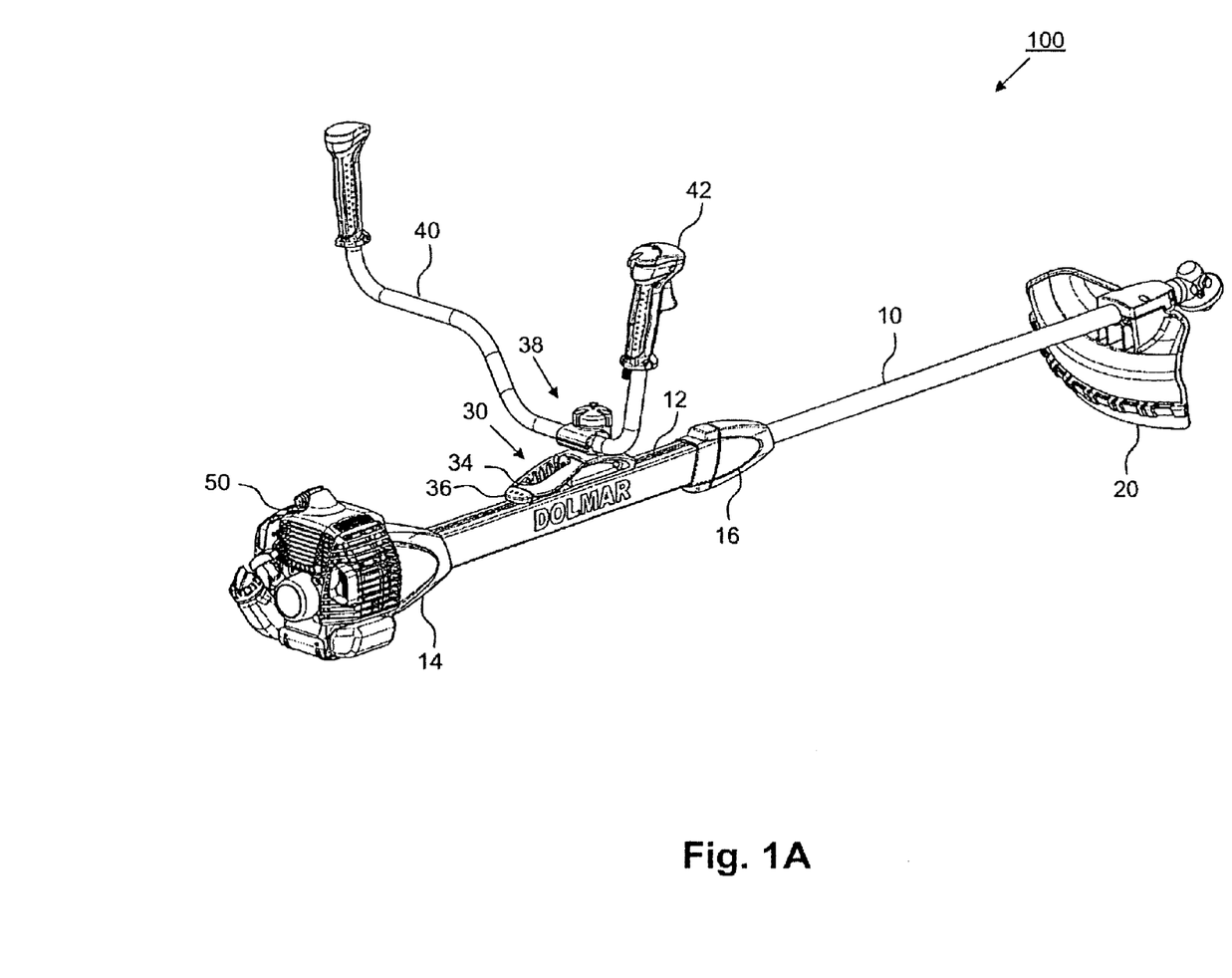
FIG. 1A an example embodiment of a portable implement according to the present invention, the operating position of which is adjustable by the principle according to the present invention, wherein the operating element of the connecting element is in the second position.

FIG. 1A shows an example embodiment of a portable implement 100, namely a trimmer, according to the present invention, the operating position of which is adjustable by the principle according to the present invention.

The trimmer 100 has a tool element 20, for example a rotating operating head, arranged on one end of a guide rod 10, for sawing and/or for cutting and/or for scything for example of undergrowth and/or of grass. At the other end of the guide rod 10, a motor 50 is arranged, constructed as a balancing weight, for driving the tool element 20.

A carrying strap (not illustrated), formed for slinging around the user of the implement, can be fitted into recesses 32a, 32b, 32c, 32d, arranged parallel to the longitudinal extent of the guide rod 10, of a perforated strip arranged between the motor 50 and the tool element 20.

The perforated strip with the recesses 32a, 32b, 32c, 32d is associated with a connecting element 30. The connecting element 30 connects a holding element 40, arranged between the perforated strip and the tool element 20, with the guide rod 10. For this, the holding element 40 is connected with the connecting element 30 by means of a clamping connection 38, constructed in the manner of a clamping collar. The holding element 40, constructed for holding, in particular for carrying and/or for guiding and/or for steering and/or for operating the portable trimmer 100, is a handlebar with two hand grips, one of the hand grips being constructed as gas grip 42. By rotating the gas grip 42, the throttle cable of the motor 50 can be operated.

The operating position of the portable implement 100, slung around the user by means of the carrying strap, in particular the angle of the guide rod 10 to the ground and the alignment of the tool element 20 to the surface which is to be worked on, can be adjusted by altering the engagement point of the carrying strap and by altering the position of the holding element 40. In this way, an adaptation of the trimmer 100 to the individual body size of the user can also be realized.

So that the operating position of the portable implement 100 can be adjusted individually, a fixed connection, for instance a clamping, of the holding element 40 on the shaft of the guide rod 10 is able to be achieved in different positions. For this, a longitudinal groove 12 is provided on the guide rod 10, in which a clamping block 52 of the connecting element 30 can be guided. When the desired operating position or operating setting or operating location of the portable implement 100 is obtained, in particular when the tool element 20 is aligned parallel to the surface which is to be worked on, the clamping block 52 can be fixed or clamped securely in the groove 12 of the guide rod 10 by means of an operating element 34 which is constructed as a lever system.

Figure 1B:
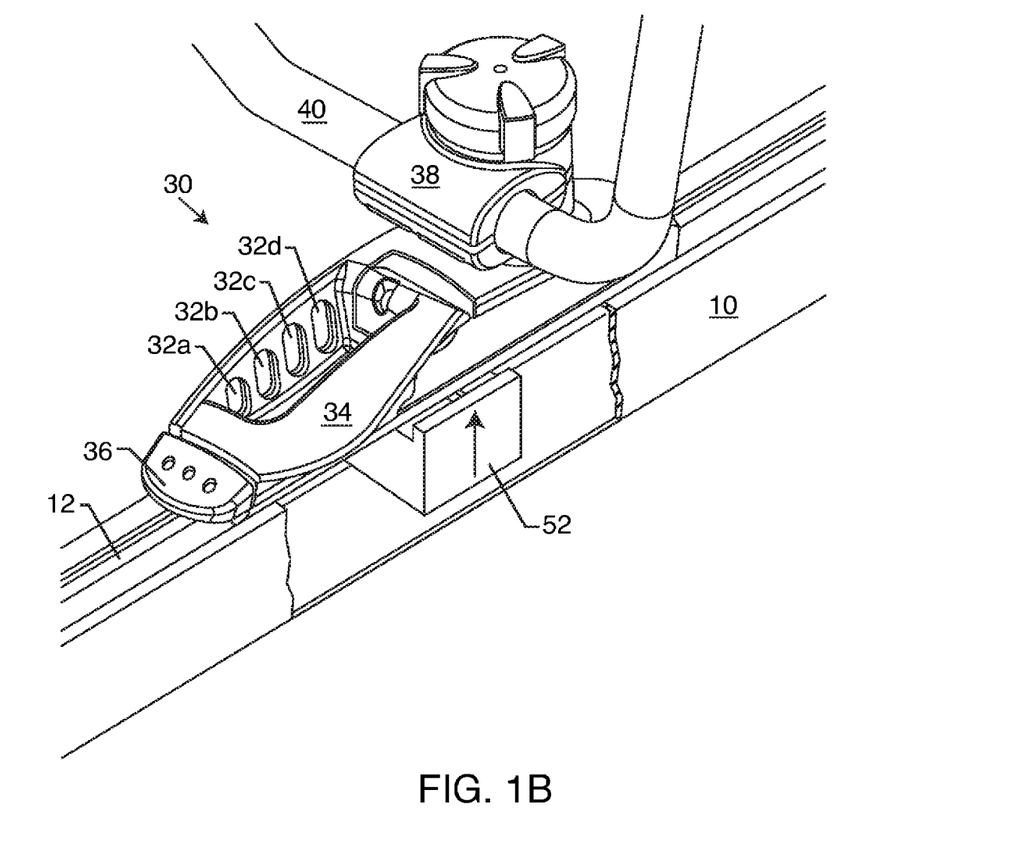
FIG. 1B an enlarged cut-out of the portable implement of FIG. 1A, the operating element of which is in the second position.

In FIG. 1A, FIG. 1B the connecting element 30 is connected in a force-fitting and/or form-fitting manner with the guide rod 10 by means of the lever 34. So that the lever 34 is not released unintentionally, it is locked by means of a detent—or arresting element 36.

Figure 2A:
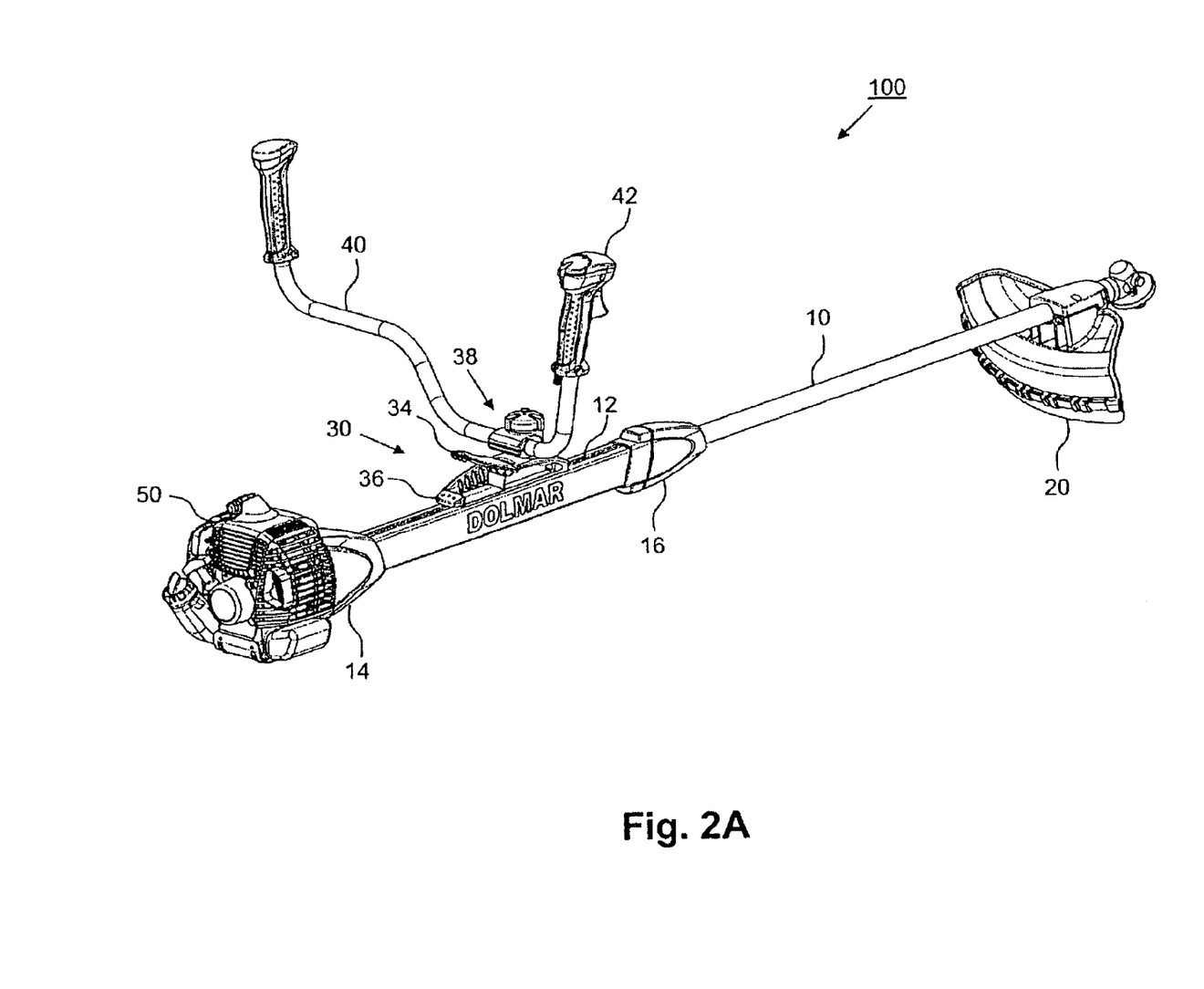
FIG. 2A the portable implement of FIG. 1A, wherein the operating element of the connecting element is in the first position.
Figure 2B:
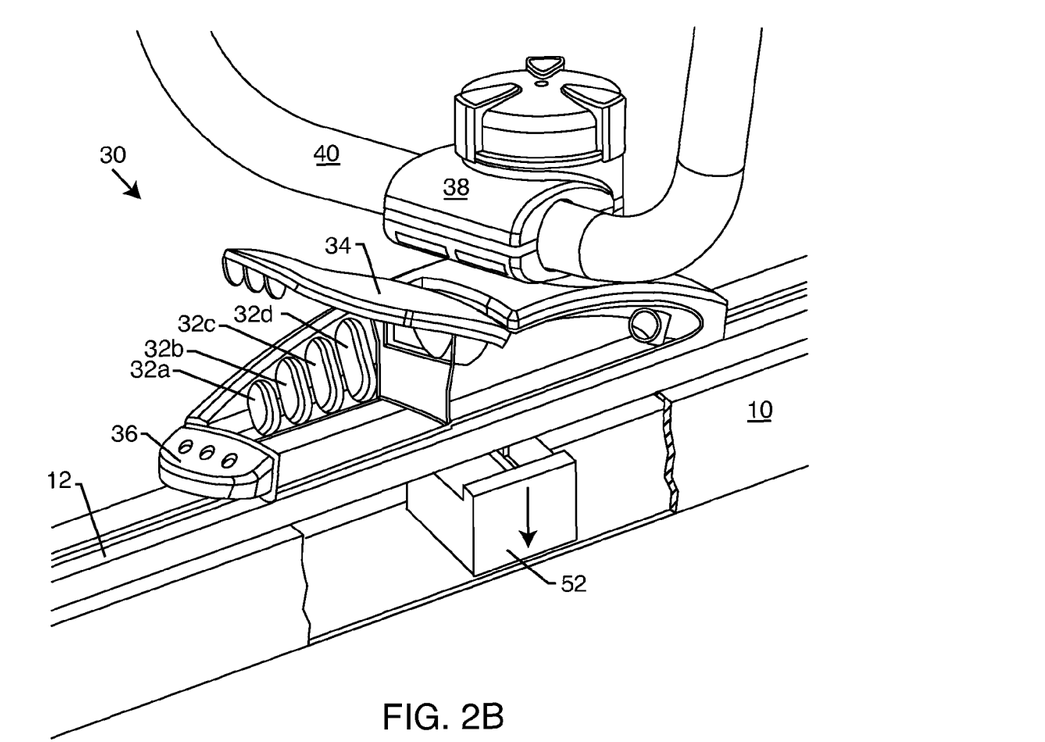
FIG. 2B an enlarged cut-out of the portable implement of FIG. 2A, the operating element of which is in the first position.

To adjust the connecting element 30, the arresting element 36 is pressed, then the lever 34 can be released. An adjusting of the connecting element or of the clamping device 30 is now possible continuously (cf. FIG. 2A, FIG. 2B). For clamping, the lever 34 is pressed into the initial position again (cf. FIG. 1A, FIG. 1B).

To adjust the desired operating position of the portable implement 100 therefore for example firstly the position of the holding element or grip tube 40 can be adjusted on the guide rod 10 by means of the clamping device 30, in order to achieve an optimum angle of the scythe or of the trimmer 100 to the ground. The individual adaptation can then be carried out by means of the fitting of the strap in the perforated bridge.

Figure 3A:
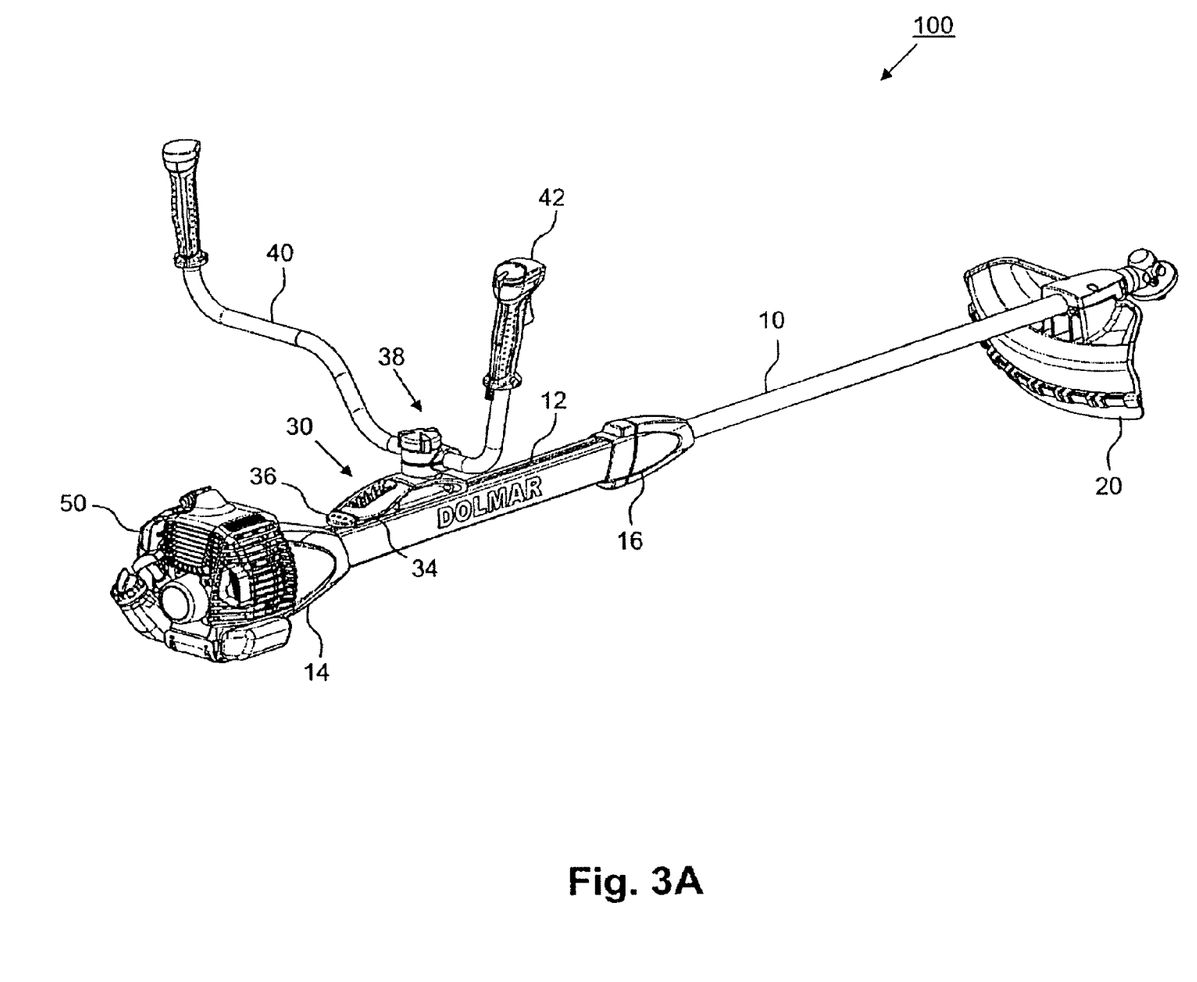
FIG. 3A the portable implement of FIG. 1A, wherein the holding element is arranged on the end, facing the motor, of the groove of the guide rod.
Figure 3B:
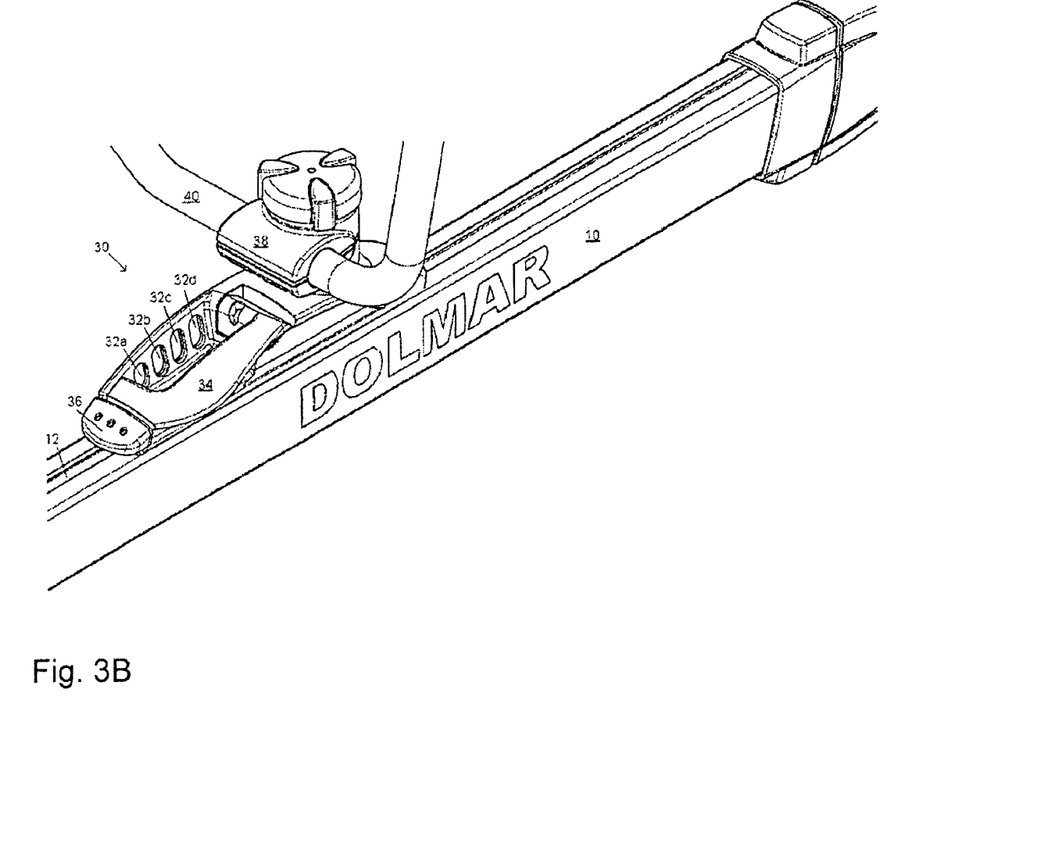
FIG. 3B an enlarged cut-out of the portable implement of FIG. 3A, wherein the holding element is arranged on the end, facing the motor, of the groove of the guide rod.
Figure 4A:
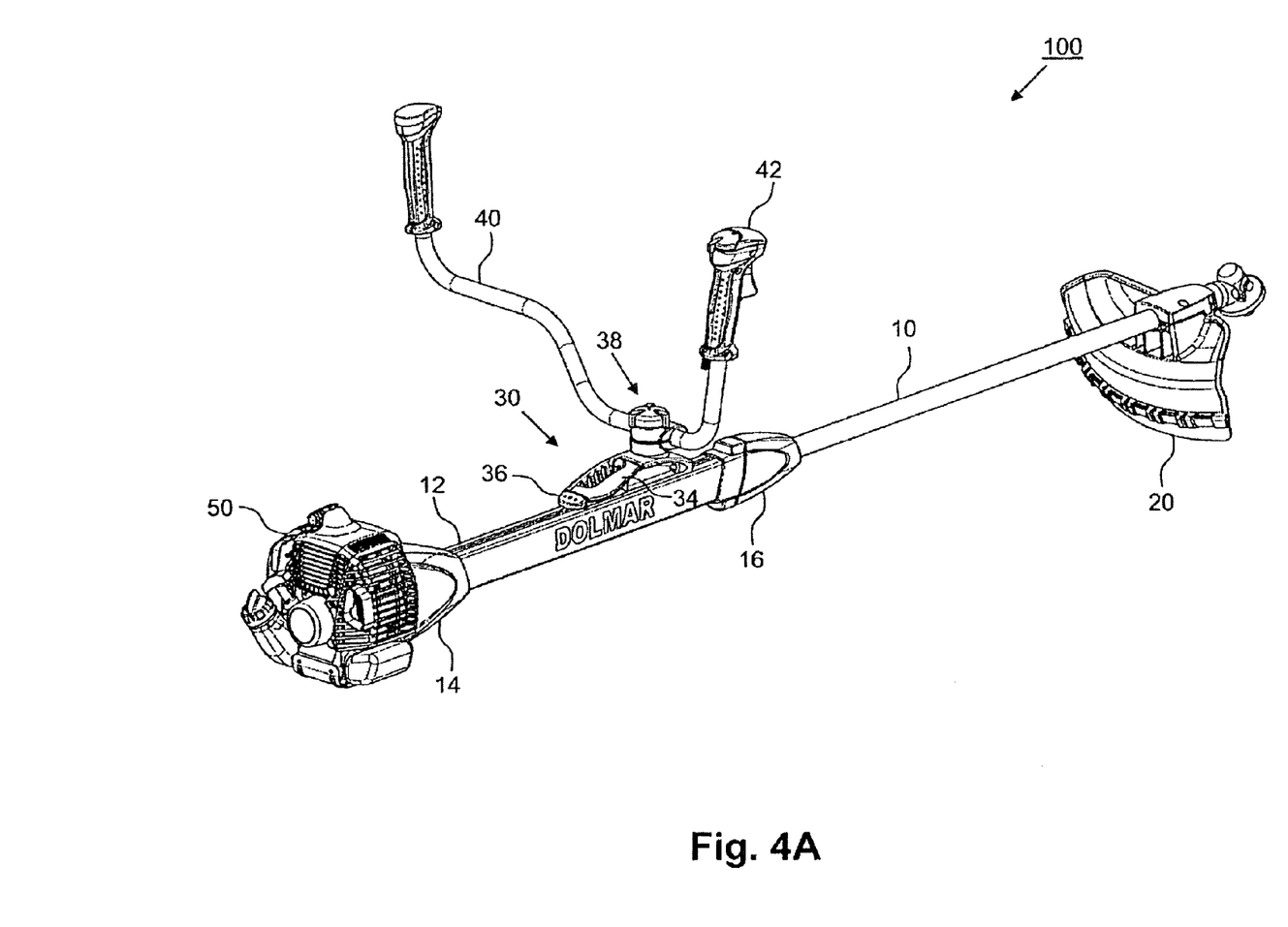
FIG. 4A the portable implement of FIG. 1A, wherein the holding element is arranged on the end, facing the tool element, of the groove of the guide rod.
Figure 4B:
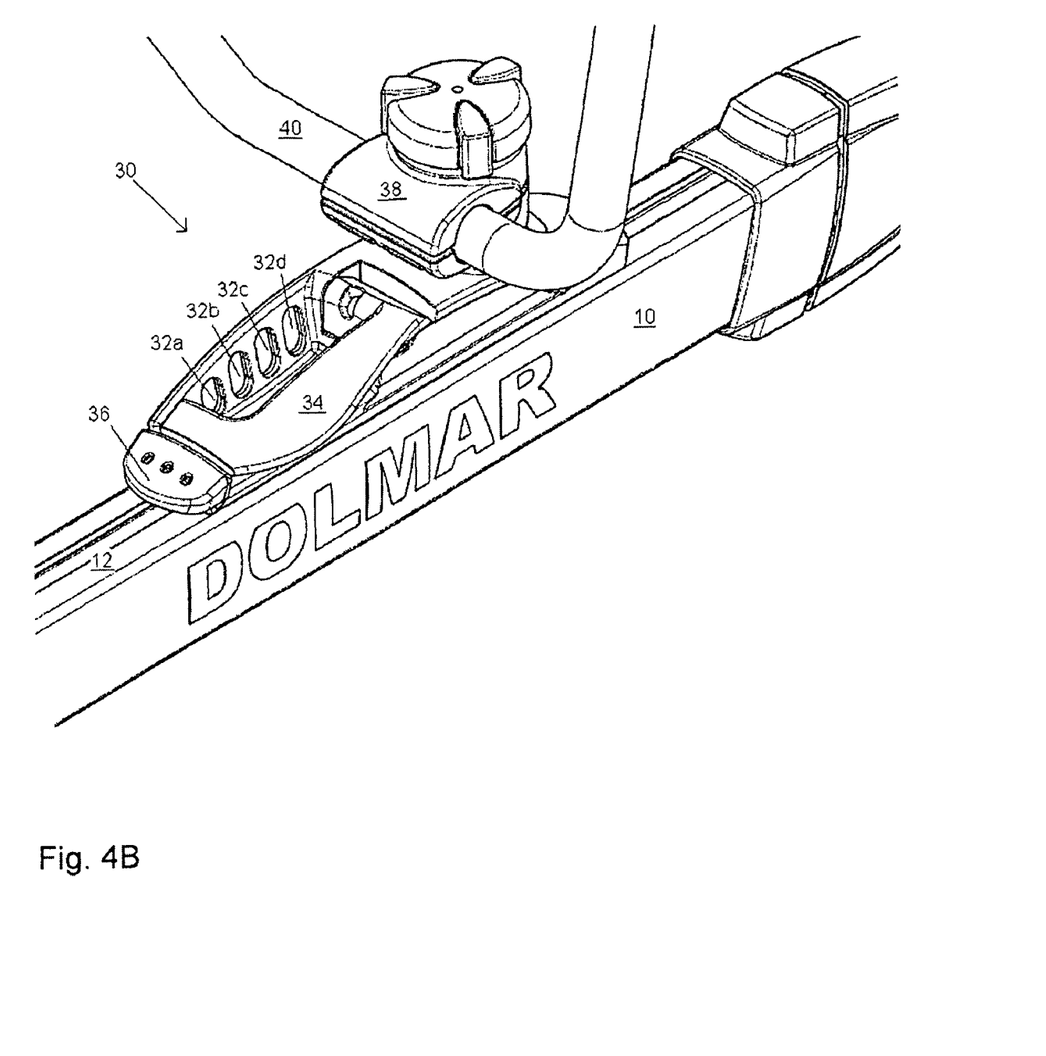
FIG. 4B an enlarged cut-out of the portable implement of FIG. 4A, wherein the holding element is arranged on the end, facing the tool element, of the groove of the guide rod.

When the lever 34 is opened, the holding element 40, constructed for example—as a clamping block 52, is adjustable or displaceable continuously by means of the connecting element 30 on the shaft, in particular on the profile or in the groove 12 of the guide rod 10. In FIGS. 3A, 3B the holding element 40 is arranged on an end of the groove 12 of the guide rod 10 facing the motor 50. In FIGS. 4A, 4B on the other hand, the holding element 40 is arranged on an end of the groove 12 of the guide rod 10 facing the tool element 20. The guide rod 10 can be constructed in two parts here. Thus, the region of the guide rod having the profile 12 or the groove can be produced separately and can then be assembled with the motor and the unprofiled part of the guide rod 10 by means of connection pieces 14, 16. Alternatively, however, the profile or the groove 12 can run over the entire length of the guide rod 10.

Depending on the size of the user or length of the sling element, the sling element is fastened on an opening or recess of the perforated strip 32a, 32b, 32c, 32d arranged closer to the motor 50 or less close to the motor 50. Thus, for example, a tall person can fit the hook of the strap system into an opening 32d of the perforated strip facing the tool element 20, whereas a shorter person uses a hole position 32a facing the motor 50 (cf. FIGS. 1B, 2B, 3B, 4B, 5B, 5C). The portable implement 100 can then be swung out by displacing the connecting element 30, with in particular the tool 20 being aligned parallel to the ground.

Figure 5A:
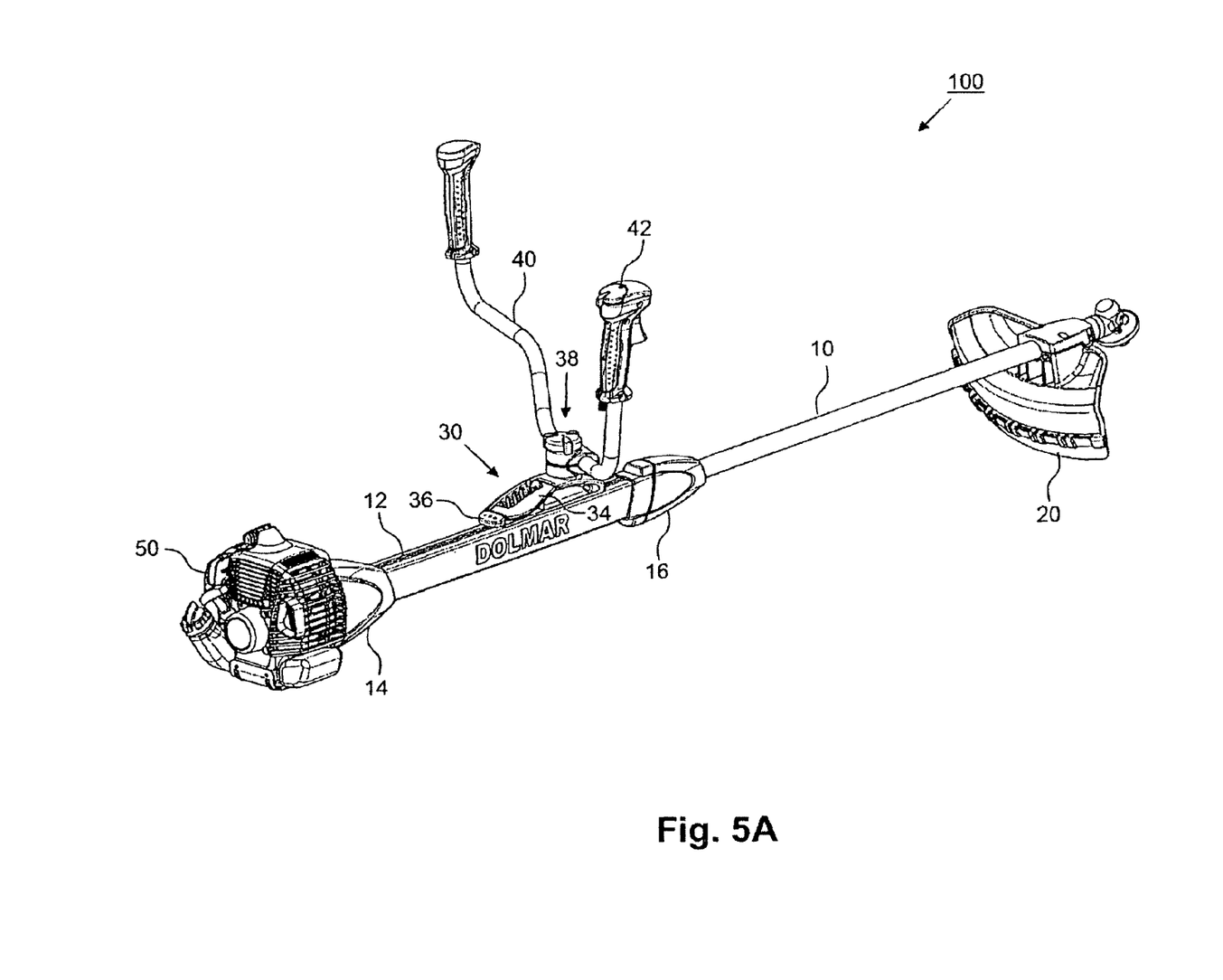
FIG. 5A the portable implement of FIG. 1A, wherein the holding element, compared with FIG. 1A, is turned about its axis running at right-angles to the guide rod.
Figure 5B:
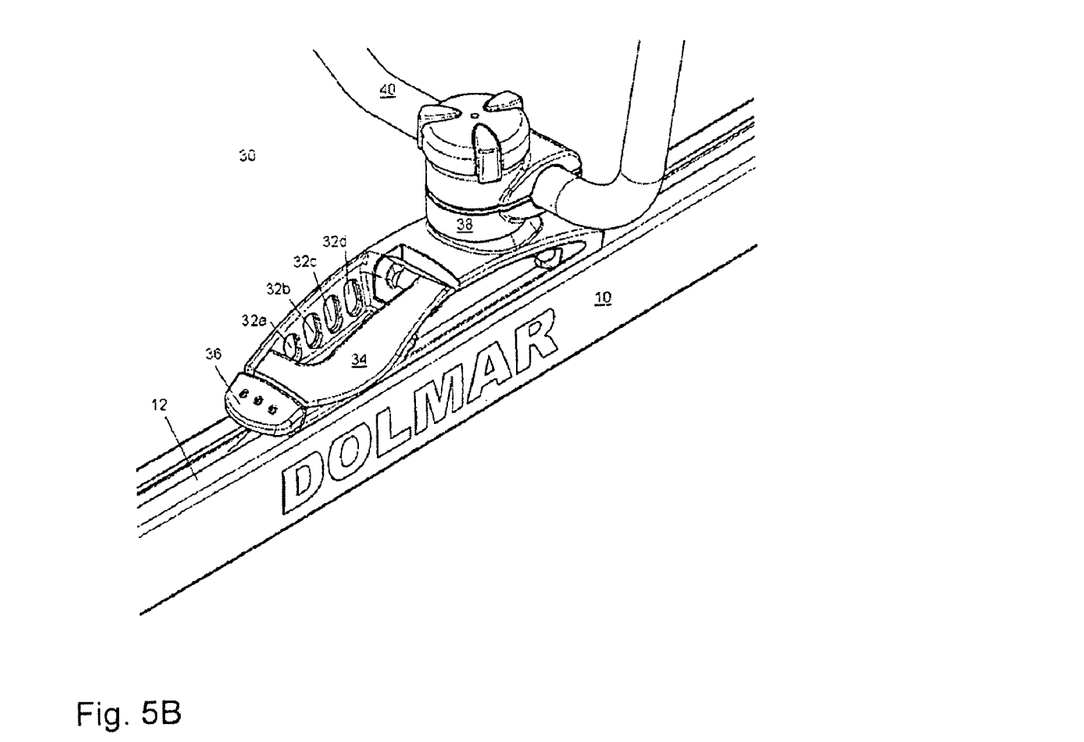
FIG. 5B an enlarged cut-out of the portable implement of FIG. 5A, wherein the holding element, compared with FIG. 1A, is turned clockwise through 180° and FIG. 5C an enlarged cut-out of the portable implement of FIG. 5A, wherein the holding element, compared with FIG. 5B, is turned clockwise through 10°.
Figure 5C:
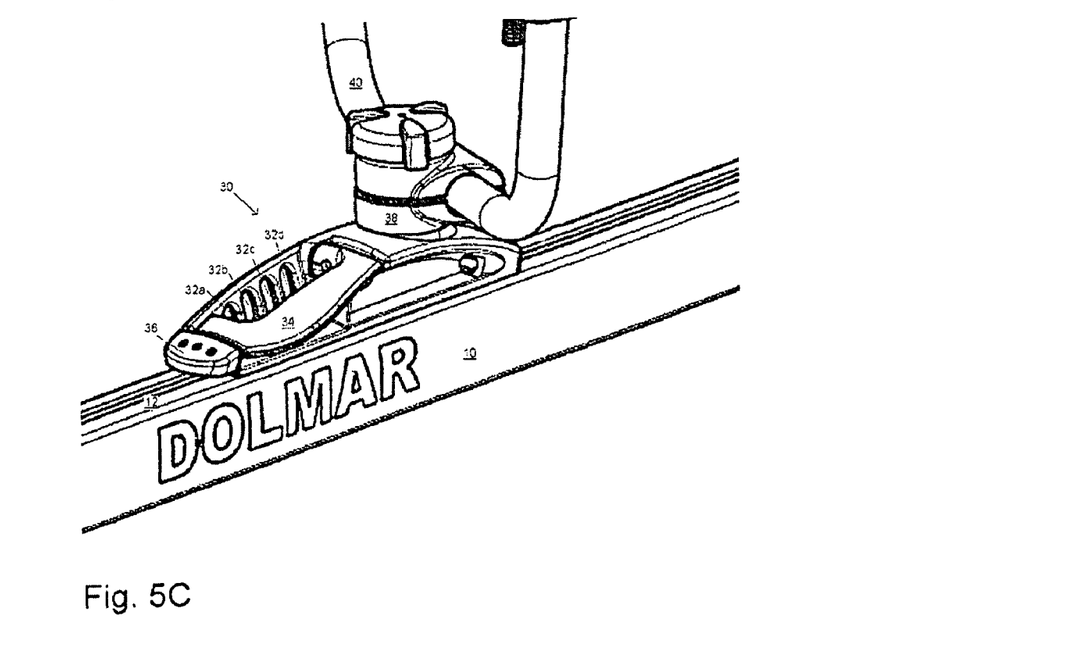

For the radial adjustment of the holding element 40, the clamping connection 38 is rotatable about its axis which is arranged substantially at right-angles to the longitudinal extent of the guide rod 10. In this way, a particularly high degree of ergonomics is obtained. The rotation direction of the clamping connection 38 and hence of the holding element 40 is illustrated in FIGS. 5B, 5C by way of example by means of an arrow.

Here, the clamping connection 38 can be adjustable for example in stages of 10 degrees (10°). Thus, in FIG. 5C the clamping collar 38 is rotated clockwise through 10° compared with FIG. 5B. In FIG. 5B the clamping connection 38 is rotated clockwise through 180° compared with FIG. 1A.

An ergonomic adjustment of the scythe 100, in particular of the holding element 40, of the tool element 20 and of the motor 50, to the operator can therefore take place, wherein also an adaptation can be carried out between the hole position of the sling strap and of the operating grip. In addition, the scythe 100 can be transported in a space-saving manner.

The invention claimed is:

1. A portable implement having at least one tool element, arranged on one end of a guide rod, at least one motor arranged on the other end of the guide rod, at least one holding element arranged between the tool element and the motor, and at least one connecting element arranged on the guide rod and/or on the holding element connecting the holding element to the guide rod, characterized in that:

the connecting element comprises at least one operating element cooperating with the guide rod, such that, when the operating element is in a first position the connecting element is displaceable in a longitudinal direction on the guide rod and when the operating element is in a second position the connecting element is fixedly connected to the guide rod in a force-fitting and/or form-fitting manner and not displaceable on the guide rod; and the connecting element further comprises at least one arresting and/or detent element cooperating with the operating element, such that, when the operating element is in the second position it is locked by or engaged with the arresting and/or detent element, wherein the arresting and/or detent element is moveable so as to release the operating element to the first position;

further characterized by a sling element, comprising at least one sling strap, connected to the connecting element for slinging the portable implement around a user of the portable implement, and for adapting the portable implement to a body, including the body height and/or the body build, of the user, wherein the connecting element has at least two openings arranged staggered with respect to each other in a longitudinal direction to the guide rod in the form of at least one perforated strip of openings arranged in the longitudinal direction to the guide rod, wherein the openings are formed to receive the sling element by fitting at least one hook or carabiner associated with the sling element.

2. The portable implement according to claim 1, characterized in that the connecting element to receive the holding element has at least one releasable clamping connection in the form of a clamping collar.

3. The portable implement according to claim 2, characterized in that the clamping connection is rotatable about its axis, which is arranged substantially at a right-angle to the longitudinal extent of the guide rod and the clamping connection is releasably connectable with the connecting element in a force-fitting and/or form-fitting manner.

4. A portable implement having at least one tool element, arranged on one end of a guide rod, at least one motor arranged on the other end of the guide rod, at least one holding element arranged between the tool element and the motor, and at least one connecting element arranged on the guide rod and/or on the holding element connecting the holding element to the guide rod, characterized in that:

the guide rod has at least one groove extending in a longitudinal direction along the guide rod;

the connecting element cooperates with the guide rod by means of at least one operating element, wherein the operating element comprises a lever rotatably and/or swivellably mounted on the connecting element, the connecting element comprises a force-fitting and/or form-fitting element in the form of a clamping block disposed in the groove which cooperates with the operating element and is constructed to selectively produce a force-fitting and/or form-fitting connection with the guide rod, such that:

when the operating element is in a first position the clamping block does not produce a force-fitting and/or form-fitting connection with the guide rod such that the connecting element is displaceable in a longitudinal direction on the guide rod; and when the operating element is in a second position the clamping block does produce a force-fitting and/or form-fitting connection with the guide rod such that the connecting element is fixedly connected to the guide rod in a force-fitting and/or form-fitting manner and not displaceable on the guide rod.

5. The portable implement according to claim 4, characterized in that
the connecting element further comprises at least one arresting and/or detent element cooperating with the operating element, such that, when the operating element is in the second position it is locked by or engaged with the arresting and/or detent element, wherein the arresting and/or detent element is moveable so as to release the operating element to the first position.

6. The portable implement according to claim 4, further characterized by a sling element, comprising at least one sling strap, connected to the connecting element for slinging the portable implement around a user of the portable implement, and for adapting the portable implement to a body, including the body height and/or the body build, of the user, wherein the connecting element has at least two openings arranged staggered with respect to each other in a longitudinal direction to the guide rod in the form of at least one perforated strip of openings arranged in the longitudinal direction to the guide rod, wherein the openings are formed to receive the sling element by fitting at least one hook or carabiner associated with the sling element.

7. The portable implement according to claim 4, characterized in that the connecting element to receive the holding element has at least one releasable clamping connection in the form of a clamping collar.

8. The portable implement according to claim 7, characterized in that
the clamping connection is rotatable about its axis, which is arranged substantially at a right-angle to the longitudinal extent of the guide rod and the clamping connection is releasably connectable with the connecting element in a force-fitting and/or form-fitting manner.

9. A portable implement having at least one tool element, arranged on one end of a guide rod, at least one motor arranged on the other end of the guide rod, at least one holding element arranged between the tool element and the motor, and at least one connecting element arranged on the guide rod and/or on the holding element connecting the holding element to the guide rod,
characterized in that:
the guide rod has at least one groove extending in a longitudinal direction along the guide rod;

the connecting element cooperates with the guide rod by means of at least one operating element, wherein the operating element comprises a lever rotatably and/or swivellably mounted on the connecting element, the connecting element comprises a force-fitting and/or form-fitting element in the form of a clamping block disposed in the groove which cooperates with the operating element and is constructed to selectively produce a force-fitting and/or form-fitting connection with the guide rod, such that:

when the operating element is in a first position the clamping block does not produce a force-fitting and/or form-fitting connection with the guide rod such that the connecting element is displaceable in a longitudinal direction on the guide rod; and when the operating element is in a second position the clamping block does produce a force-fitting and/or form-fitting connection with the guide rod such that the connecting element is fixedly connected to the guide rod in a force-fitting and/or form-fitting manner and not displaceable on the guide rod; and the connecting element to receive the holding element has at least one releasable and rotatable clamping connection in the form of a clamping collar.

10. The portable implement according to claim 9, characterized in that
the clamping connection is releasably connectable with the connecting element in a force-fitting and/or form-fitting manner.

11. The portable implement according to claim 9, characterized in that
the connecting element further comprises at least one arresting and/or detent element cooperating with the operating element, such that, when the operating element is in the second position it is locked by or engaged with the arresting and/or detent element, wherein the arresting and/or detent element is moveable so as to release the operating element to the first position.

12. The portable implement according to claim 9, further characterized by a sling element, comprising at least one sling strap, connected to the connecting element for slinging the portable implement around a user of the portable implement, and for adapting the portable implement to a body, including the body height and/or the body build, of the user, wherein the connecting element has at least two openings arranged staggered with respect to each other in a longitudinal direction to the guide rod in the form of at least one perforated strip of openings arranged in the longitudinal direction to the guide rod, wherein the openings are formed to receive the sling element by fitting at least one hook or carabiner associated with the sling element.

* * * * *